United States Patent Office 3,169,802
Patented Feb. 16, 1965

3,169,802
FLUID PRESSURE BRAKE CONTROL APPARATUS
WITH EMPTY AND LOAD CHANGE-OVER
Dale A. Chovan, Trafford, Pa., assignor to Westinghouse
Air Brake Company, Wilmerding, Pa., a corporation of
Pennsylvania
Filed Apr. 25, 1963, Ser. No. 275,580
5 Claims. (Cl. 303—23)

This invention relates to fluid pressure brake apparatus for railway vehicles and more particularly to load controlled fluid pressure brake apparatus.

In brake systems for railway vehicles employing change-over valve devices to compensate for load or empty as well as for partially loaded vehicles, some difficulty is encountered in making a minimum brake application under a no-load railway car condition. Greater consideration has been given to utilization of load control apparatus for braking systems because of the increased use of light weight materials in the construction of railway cars and the increase in length of railway cars. Since the increase in length of a railway car results in making the difference in weight, between a fully loaded railway car and an emtpy car, materially greater, it is therefore desirable to provide a simple and economical load responsive braking apparatus operative to provide under no-load condition sufficient pressurization of the brake cylinder to assure movement of the brake shoes into contact with the tread of the wheel on a minimum brake application as well as under a loaded condition of a railway car.

It is an object of this invention to provide a new and improved change-over valve device operative to provide a minimum brake application under a no-load condition wherein the change-over valve device is economical in construction. Provision is made to design novel features into the diaphragm cover of the differential relay valve portion of the change-over valve device which provides economical means for converting existing change-over valve devices to include an inshot feature which gives minimum brake application under a no-load condition without interfering with a full brake application under a load condition.

In accordance with this invention, the change-over valve device comprises a sectionalized casing containing a differential piston in the form of coaxial spaced diaphragms of different effective pressure areas wherein the diaphragms cooperate with the casing to define three adjoining chambers, i.e. an intermediate chamber and two outer chambers, such that the differential piston is adapted to actuate a valve member cooperative with a valve seat. A load measuring device is operatively connected to the change-over valve device to condition a selector valve under an empty railway car condition to supply pressurized fluid upon a brake application to one of the outer chambers defined by the smaller diaphragm, and to a piston valve device located on a cover portion of the sectionalized casing which directs such fluid to the intermediate chamber whereby the valve member is actuated to direct controlled actuating pressure into the brake cylinders for a brake application. Simultaneously with such action a portion of the pressurized fluid is directed through a choke into the other outer chamber as defined by the larger diaphragm to balance the differential piston and seat the valve member. Such piston value device is operative upon a prodetermined pressure build up in such intermediate chamber to cut off the supply of fluid to such intermediate chamber and seat such piston valve device and thereafter remains inoperative until release of the brakes so that the pressurized fluid acts on the differential piston only through its application on the outer chamber as defined by the smaller diaphragm.

Such piston valve device provides a certain predetermined minimum force which actuates the valve member thereby requiring a predetermined build up of pressure in a brake cylinder and the balancing chamber whereby the brake shoes are brought into braking contact with the tread of an associated wheel when a minimum brake application is made.

Under a loaded car condition the piston valve device cooperates with the change-over valve device as conditioned by the load measuring device to connect the outer chamber defined by the smaller diaphragm as well as the intermediate chamber to the controlled actuating pressure fluid to unseat the valve member, whereby pressure fluid is directed to the brake cylinder and the other outer chamber to balance the differential piston such that the fluid pressure developed in the brake cylinder is equal to the pressure of the controlled actuating fluid and is greater than where only the one outer chamber is pressurized.

Figure 1:
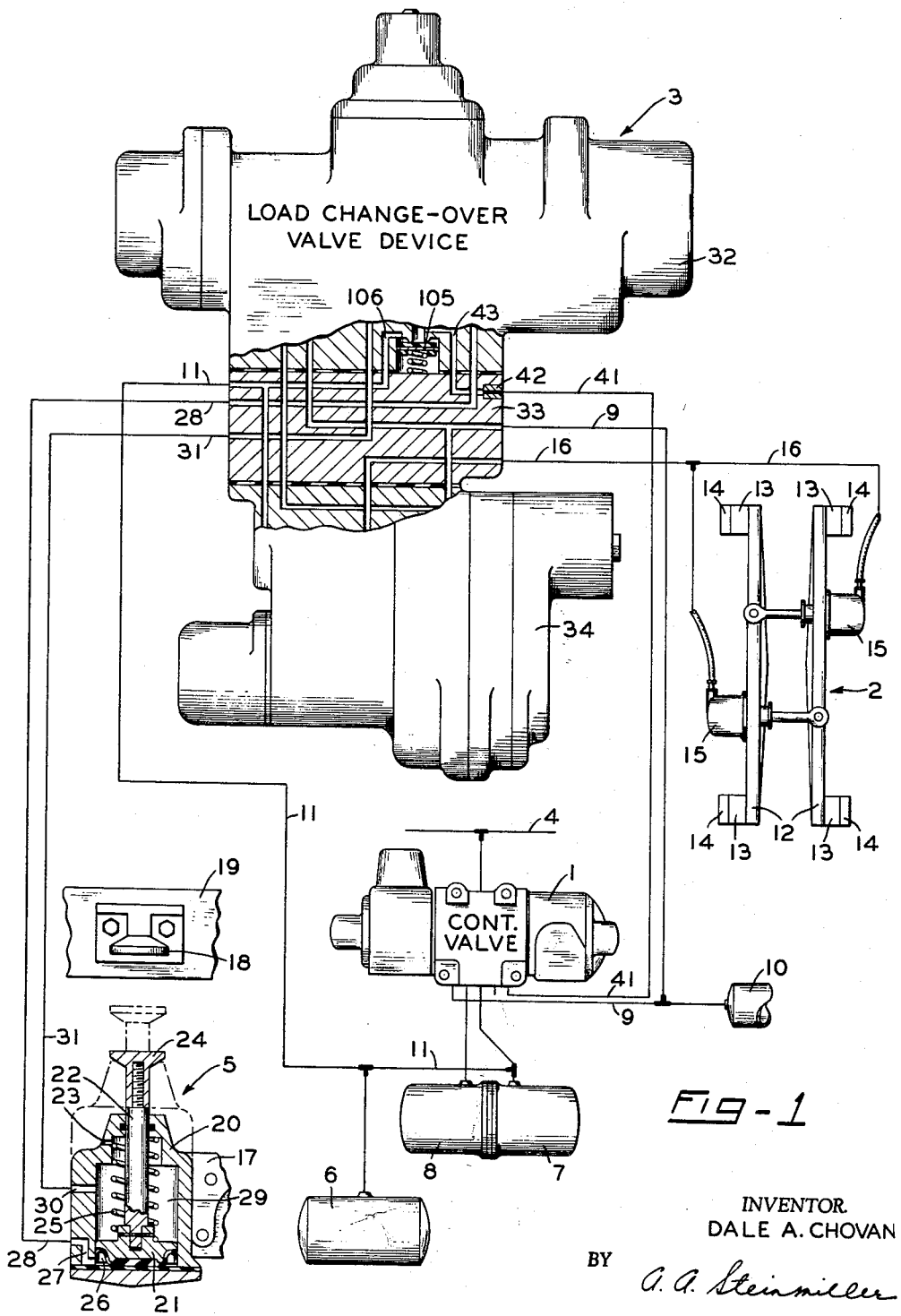
FIG. 1 is a diagrammatic view, partly in section, showing a railway car brake equipment which includes a novel brake control apparatus for automatically controlling brake pressure according to the loaded or empty condition of a railway car.

As shown in FIG. 1 of the drawings, the fluid pressure brake equipment comprises a brake control valve device 1, brake means or brake rigging 2, a load change-over valve device 3, brake pipe 4, load measuring device 5, air reservoir 6, auxiliary reservoir 7, and emergency reservoir 8.

The brake control valve device 1 is of the usual well-known type which responds to the charging of the brake pipe 4 to charge the auxiliary reservoir 7 and emergency reservoir 8 in a manner well known and understood in the art, and which responds to a reduction in pressure in brake pipe 4 to direct pressurized fluid from the auxiliary reservoir 7 via a brake cylinder supply pipe 9 to the load change-over valve device 3 for a braking application. The supply pipe 9 is connected to a displacement volume reservoir 10 to compensate for the limited volume acted upon in the change-over valve device 3 by the pressurized fluid from the air reservoir 6, auxiliary reservoir 7, and emergency reservoir 8. A conduit 11 has branch conduits interconnecting the air reservoir 6, the auxiliary reservoir 7, the brake control valve device 1 and a passageway in the changeover valve device 3.

The brake riging 2 comprises a pair of brake beams 12 that normally extend crosswise of the railway car in parallel spaced relationship to each other. The brake beams 12 are adapted to be movably supported at each end of the side frame members of a car truck in a manner well understood in the art. Supported adjacent the outer ends of each brake beam 12 are brake heads 13 which carry brake shoes 14 respectively for contact with the brake tread of an associated wheel. Each brake beam 12 has suitably rigidly secured thereto a brake cylinder 15 in which is reciprocably mounted a piston whose rod is secured to the oppositely disposed brake beam 12, such that pressurization of the respective cylinder ends of each brake cylinder 15 causes the respective brake shoes 14 to contact the associated adjacent wheels for a braking application in a manner well understood in the art. Pressurized fluid is supplied to the respective brake cylinders 15 via a conduit 16 connected to a passageway in the change-over valve device 3.

The load measuring device 5 (FIG. 1) is mounted on a suitable sprung portion of a railway car, such as the car truck bolster, by a bracket 17 substantially in line with a stop member 18. Stop member 18 is suitably mounted on bracket 19, which bracket 19 is suitably attached to an unsprung part of the car truck, such as the side frame of the car truck. Engagement between stop member 18 and the load measuring device 5 operates in a manner to be described.

The loading measuring device 5 comprises a vertically disposed strut cylinder 20, in which cylinder 20 is slidably mounted a control piston 21 having a piston rod 22 extending through and slidably guided in the non-pressure head of the upper portion thereof. The upper end portion of strut cylinder 20, closely adjacent the non-pressure head, is vented to atmosphere via a port 23. The uppermost end portion of a piston rod 22 has a stop member 24 adjustably mounted thereon for engagement with the stop member 18. A spring 25, encompasses the piston rod 21, has its upper end seated on the upper end portion of strut cylinder 20 and its lowermost end portion engaging the piston 21, whereby the spring 25 biases piston 21 to its lowermost position in the strut cylinder 20. A pressure chamber 26 at the lower end portion of strut cylinder 20 defined by the piston 21 and the lowermost end portion of cylinder 20 is connected via a passageway 27 to a conduit 28 for connection to the change-over valve device 3. A non-pressure chamber 29, at the upper end portion of strut cylinder 20, defined by the piston 21 and the upper end portion of strut cylinder 20 is connected via a passageway 30 to a conduit 31 for connection to the change-over valve device 3. In a loaded condition of a railway car, the stop member 24 is a greater distance from the stop member 18 than when the car is empty, since the stop member 24 is on the sprung portion of the railway car, and the springs supporting the sprung portion are compressed in accordance with the degree of loading on the sprung portion.

The term empty railway car, designates an unloaded, partially loaded, or empty condition of a railway car such that on pressurization of chamber 26 the upward movement of piston 21 is insufficient to establish communication between passageways 27 and 30; whereas, a loaded railway car designates a car that is fully loaded, or partially loaded such that on pressurization of chamber 26, the upward movement of piston 21 is sufficient to establish communication between passageways 27 and 30.

The load change-over valve device 3 (FIG. 2) comprises a sectionalized casing having a change-over valve portion 32, a pipe bracket portion 33, and a relay valve portion 34.

Change-over valve portion 32 has a bore 35 extending longitudinally therethrough, having its respective end portions communicating with enlarged bore portions. The enlarged bore portions have motor pistons 36 and 37 respectively therein with the adjacent ends of the motor pistons 36 and 37 operatively connected together by stem portions in a manner to be described.

Figure 2:
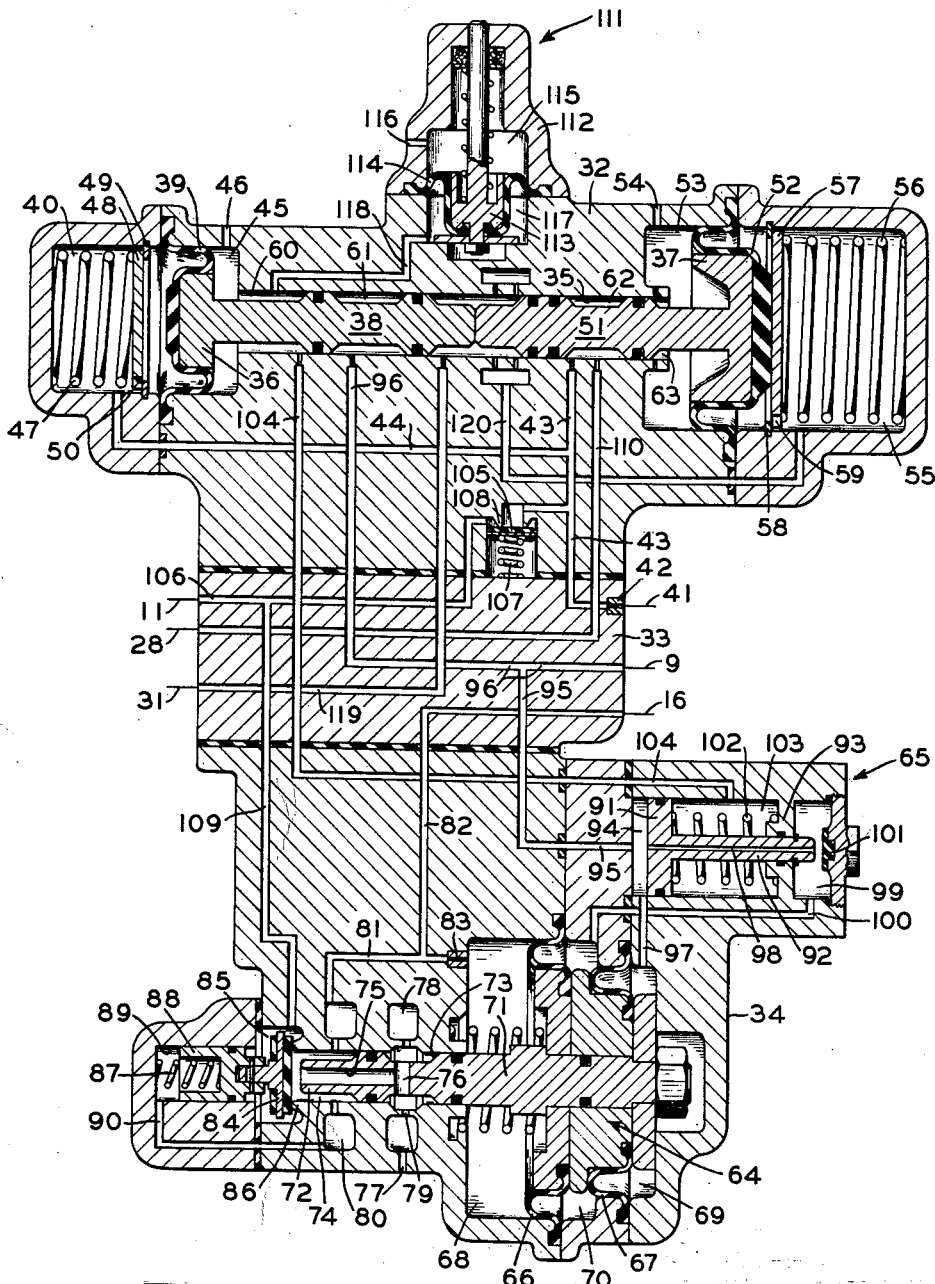
FIG. 2 is a cross sectional elevational view of the change-over valve device shown in FIG. 1.

Motor piston 36 has a stem portion 38 extending rearwardly therefrom and is slidably received by the bore 35. Motor piston 36 has a forwardly disposed portion which is suitably connected to a flexible diaphragm 39, whose outer periphery edge is clamped between portions of the sectionalized casing of change-over valve device 3. The diaphragm 39 is subject on one side to the pressure of fluid in a control chamber 40 having fluid under pressure supplied thereto from a charging pipe 41 via a choke 42, a passageway 43 and a branch passageway 44. In accordance with the usual practice, charging pipe 41 has one end constantly open to the brake pipe 4 through the brake control valve device 1, and the other end connected to passageway 43 to maintain control chamber 40 at brake pipe pressure. The other side of diaphragm 39 is subject to pressure in a chamber 45 which is constantly open to atmosphere via a port 46. Chamber 40 houses a spring 47, which spring 47 has one end seated on the inner end wall thereof and the other end abuttingly engaging a follower disc 48 thereby biasing disc 48 into engagement with the motor piston 36. Chamber 40 has an annular recess which recess receives an annular stop ring 49 which limits the movement of follower disc 48 toward the motor piston 36 as illustrated in FIG. 2. Follower disc 48 is suitably recessed as at 50 to provide communication between the various portions of chamber 40 to assure equalization of pressure throughout chamber 40.

Motor piston 37 has a stem portion 51 extending rearwardly therefrom and is slidably received by the bore 35 with the rear end portion of stem 51 abuttingly engaging stem portion 38. Motor piston 37 has its forward portion suitably connected to a diaphragm 52 whose outer peripheral edge is suitably clamped between portions of the sectionalized casing of the change-over valve device 3. Diaphragm 52 is subject on one side to pressure in a chamber 53 which is constantly open to atmosphere via a passageway 54 and on its opposite side to pressure in chamber 55 which chamber 55 is subject to being pressurized by the brake pipe fluid in a manner to be described.

It is to be noted that the cross sectional area of the motor piston 37 is greater than motor piston 36, such that when the brake pipe pressure is introduced into chambers 55 and 40, the total resultant force exerted on pistons 36 and 37 will move motor pistons 36 and 37 with their respective stem portions leftward as viewed in FIG. 2.

Chamber 55 houses a spring 56 which has one end seated on the inner wall surface of the chamber 55 and the other end abuttingly engaging a follower disc 57, for biasing follower disc 57 into engagement with the motor piston 37. The chamber 55 has an annular recess which receives an annular stop ring 58 which limits the movement of follower disc 57 towards the motor piston 37. Follower disc 57 is suitably recessed or grooved as at 59 on its outer periphery to maintain fluid communication between all portions of chamber 55.

Stem 38 of motor piston 36 has a reduced end portion and a pair of annular grooves 60 and 61 to define a pair of spaced lands therebetween, which lands slidingly contact the inner wall surface of bore 35. Stem 51 of motor piston 37, similarly has a reduced end portion and a pair of spaced annular grooves 62 and 63 defining land portions therebetween, which land portions slidably engage the inner wall surface of the bore 35. The lands and grooves of stems 38 and 51 operate to cover and uncover ports in a manner to be described.

Relay valve portion 34 houses a relay valve device 64 and an inshot valve device 65. Relay valve device 64 has a pair of spaced diaphragms 66 and 67, which diaphragms 66 and 67 have their respective outer peripheral edges clamped between portions of the sectionalized casing of the relay valve portion 34. Diaphragms 66 and 67 cooperate with the sectionalized casing to define a pair of spaced outer chambers 68, 69 and an intermediate chamber 70. The one outer chamber 68 is hereinafter referred to as the balancing chamber 68. Relay valve device 64 has a stem 71 which stem 71 has a reduced end portion 72. In addition, stem 71 has an annular groove 73 on the intermediate portion thereof. The reduced end portion 72 of stem 71 cooperates with the inner wall surface of the bore which receives the stem 71 to provide a clearance space 74 which communicates via a longitudinally extending bore 75 in the end portion of stem 71 to radially extending ports 76 which communicate with the annular groove 73. In the normal position of the relay valve device 64 in which it is shown in FIG. 2, annular groove 73 is connected to atmosphere via a port 77, an annular groove 78 and radially extending ports 79. The clearance space 74 is connected to the brake cylinders 15 via radially extending grooves, an annular groove 80, passageways 81 and 82 and conduit 16 (FIGS. 1 and 2). The clearance space 74 is also connected to the balancing chamber 68 via passageway 81 and a choke 83. Thus under normal conditions, the brake cylinders 15 and balancing chamber 68 are vented to atmosphere via the clearance space 74, bore 75, annular groove 78 and port 77.

For the controlling of fluid under pressure to and release of fluid under pressure from the brake cylinders 15, there is provided a check valve device 84 located in a chamber 85 wherein check valve device 84 is normally biased onto a seat 86 by a spring 87. Spring 87 has one end portion seated on an end wall of a casing section of the sectionalized casing, and the other end engaging a sleeve 88 integral with check valve device 84. Sleeve 88 is slidably received by a bore 89, which bore 89 is connected via a passageway 90 to annular groove 80 and the clearance space 74 to maintain bore 89 at the same pressure as clearance space 74. Under normal conditions check valve device 84 is seated on seat 86 since stem 71 and relay valve device 64 is biased by an unnumbered spring away from check valve device 84.

Inshot valve device 65 comprises a piston valve member 91 having a stem portion 92 slidably guided by a partition 93. Piston valve member 91 is subject on one side to a pressure in a chamber 94, which chamber 94 is connected via a passageway 95, branch passageway 96, and supply pipe 9 to the brake control valve device 1. Upon a reduction in brake pipe pressure as when a brake application is made, pressurized fluid is directed from the auxiliary reservoir 7, and the air reservoir 6 through the brake control valve device 1 into supply pipe 9 and thence via passageway 95 into chamber 94 for reaction on piston valve member 91 while simultaneously directing such pressurized fluid through chamber 94 and via a passageway 97 to the other outer chamber 69 in relay valve device 64, for actuation of such relay valve device 64. Piston valve member 91 has a bore 98 extending longitudinally therethrough, extending through stem 92 for communicating chamber 94 with a chamber 99. Chamber 99 is connected via a passageway 100 to the intermediate chamber 70 of the relay valve device 64. Chamber 99 has a centrally located valve seat 101 adapted to be engaged by the end portion of stem 92 upon predetermined pressurization of chamber 94 as will be described. Circumferentially encompassing the stem 92 is a spring 102 having its one end seated on the partition 93 and its other end engaging piston valve member 91 thereby biasing piston valve member 91 leftwardly as viewed in FIG. 2 to unseat the end portion of stem 92 from the valve seat 101. The value of spring 102 is so chosen as to require pressurization of chamber 94 to 10 p.s.i. thereby assuring the pressurization of chamber 99 and intermediate chamber 70 to 10 p.s.i. to provide sufficient pressurization of the brake cylinders 15 to bring the brake shoes 14 into contact with the associated tread of the wheel on a minimum brake application. A chamber 103, defined by the sectionalized casing of the relay valve portion 34, the piston valve member 91 and the partition 93, is operatively connected via a passageway 104 to the longitudinally extending bore 35 in the change-over valve portion 32. Chamber 103 is normally vented to atmosphere by its connection to bore 35 and annular groove 60 on stem portion 38 since groove 60 communicates directly to atmosphere via port 46.

In order to provide for the quick charging and recharging of the auxiliary reservoir 7, and the air reservoir 6, load change-over valve device 3 connects the charging pipe 41 via passageway 43 through a one way check valve 105, a passageway 106 to conduit 11.

One way check valve 105 is normally biased by a spring 107 into abutting engagement with a valve seat 108. Thus as pressurized fluid flows into charging pipe 41 which is open to the brake pipe 4, the pressurized fluid flows via passageway 43, past check valve 105, through passageway 106 into conduit 11 for charging the auxiliary reservoir 7 and air reservoir 6. The auxiliary reservoir 7, air reservoir 6 and emergency reservoir 8 are normally charged and recharged from the brake pipe 4 via brake control valve device 1 in the conventional manner. Passageway 106 in change-over valve device 3 has a branch passageway 109 connecting conduit 11 with chamber 85 to condition the pressurization of the brake cylinders 15 upon unseating of check valve device 84 in a manner to be described.

A passageway 110 in change-over valve device 3 connects conduit 28 from the pressure chamber 26 in strut cylinder 20 to annular groove 62 on stem portion 51 of motor piston 37 for a purpose to be described.

The uppermost central portion of change-over valve device 3 as viewed in FIG. 2 has a load indicating means 111 comprising an inverted cup-shaped housing 112 suitably secured to the change-over valve portion 32. A movable abutment 113 having a resilient diaphragm 114 is located in the bore between change-over valve portion 32 and the cup-shaped housing 112 with the outer peripheral edge of diaphragm 114 clamped therebetween. Movable abutment 113 is subject on one side to the pressure in chamber 115 which is vented to atmosphere via port 116 and on the other side to the pressure in chamber 117 which is connected via passageway 118 to the left-hand portion of bore 35 as viewed in FIG. 2.

In the operation of the brake apparatus described, it is to be assumed that an empty condition of a railway car is present. The strut cylinder 20 assumes a position relative to the unsprung portion of the railway car, such as bracket 19, that the stop member 24 will be relatively close to the stop member 18 since the car springs are not compressed as greatly as when the car is loaded. Upon pressurization of chamber 26 via conduit 28 in a manner to be described, piston 21 will move upwardly in strut cylinder 20 only a limited amount due to engagement of stop member 24 by stop member 18, such that communication is blocked between passageways 27 and 30. In addition to an empty condition of a railway car, assume initially that the brake pipe 4 is charged to its normal charge value by a supply of fluid under pressure to the brake pipe 4 in a well-known manner, and that the brake control valve device 1 responds to the charging of the brake pipe 4 to charge air reservoir 6, auxiliary reservoir 7, and emergency reservoir 8 with fluid at the pressure of the fluid in the brake pipe 4. Simultaneously with such action strained air flows through the control valve device 1, charging pipe 41, passageway 43, annular groove 62 on stem 51, passageway 110, conduit 28 to charge chamber 26 in the lower end portion of strut cylinder 20 in load measuring device 5. Since the railway car is in an empty condition as discussed above where the stop member 24 is relatively close to stop member 18, pressurization of chamber 26 produces no result since the upward movement of control piston 21 does not establish communication between passageways 27 and 30. Pressurized fluid flowing from charging pipe 41 in addition to flowing via passageway 43 into the annular groove 62, flows into branch passageway 44 for charging control chamber 40 to provide a reactionary force on motor piston 36 and motor piston 37 to thereby move the diaphragm 39 and motor piston 36 rightward as viewed in FIG. 2 to condition the change-over valve device 3 for operation. In such rightward movement of diaphragm 39, motor piston 36, stems 28 and 51, diaphragm 52 and motor piston 37 move rightward therewith. Such rightward movement blocks communication between passageways 43 and 110; however, such action connects passageway 110 to atmosphere via chamber 53 and port 54 thereby venting chamber 26 in strut cylinder 20, since chamber 26 is connected via conduit 28, passageway 110, chamber 53, and port 54 to atmosphere. Spring 25 in strut cylinder 20 biases control piston 21 downwardly to disengage stop member 24 from stop member 18 to thereby restore the load measuring device 5 to an inactive position following such weighing operation.

Pressurization of the air reservoir 6, and auxiliary reservoir 7 during initial charging of the brake pipe 4 interconnects the pressurized fluid from the air reservoir 6 and auxiliary reservoir 7 via conduit 11, passageway 106, branch passageway 109 to pressurize chamber 85 and thereby conditions the change-over valve device 3 for a braking operation in a manner to be described.

When brake pipe pressure is reduced under operator control in the usual manner for causing a brake application, brake control valve device 1 operates to supply fluid from air reservoir 6, and auxiliary reservoir 7 to brake cylinder supply pipe 9 in the conventional manner. Such pressurized fluid flows via supply pipe 9, passageway 96, and branch passageway 95 to pressurize chamber 94, while simultaneously flowing through chamber 94 into passageway 97 to charge outer chamber 69 for actuating the relay valve device 64. Pressurized fluid also flows through chamber 94, through bore 98 in stem portion 92 of piston valve member 91 into chamber 99, which chamber 99 is connected to intermediate chamber 70 via a passageway 100 to thereby charge intermediate chamber 70. The resultant force developed by the pressurization of chambers 70 and 69, in effect governed by the pressurization of chamber 70 since diaphragm 67 is common to both chambers 69 and 70, moves differential relay valve device 64 leftward as viewed in FIG. 1 until reduced end portion 72 of valve stem 71 unseats the check valve device 84 to interconnect pressurized fluid contained in chamber 85 to the clearance space 74 provided between the wall of the bore which received stem 71 and the reduced end portion 72 of stem 71, such that the pressurized fluid flows via annular groove 80, passageway 81 simultaneously to balancing chamber 68 via choke 83, and to brake cylinders 15 wherein brake cylinders 15 receive pressurized fluid via passageways 81, 82, and conduit 16. It is to be noted that the balancing chamber 68 is supplied by pressurized fluid through a choke 83 which assures the proper distribution of pressurized fluid to the brake cylinder devices 15 which are of relatively large capacity compared to the relatively small capacity of balancing chamber 68. The value of spring 102 in chamber 103 is so chosen such that upon development of approximately 10 p.s.i., in chamber 94, piston valve member 91 moves rightward as viewed in FIG. 2 to seat the rightward most end portion of stem 92 on valve seat 101 to thereby interrupt the further flow of fluid from chamber 94 via bore 98 to intermediate chamber 70. Approximately 10 p.s.i. pressure is developed in intermediate chamber 70, prior to the interruption of flow of fluid to chamber 70. Such pressurization of chamber 70 and the brake cylinder 15 provides under a minimum brake application sufficient force to bring the brake shoes 14 into abutting contact with the tread of an associated railway wheel.

Any additional reduction in brake pipe pressure results in the additional charging of conduit 9 from the auxiliary reservoir 7, and the air reservoir 6 to thereby provide a further build up of brake cylinder supply pressure above 10 p.s.i. With the additional brake pipe reduction, pressurized fluid flows from the auxiliary reservoir 7 and air reservoir 6, through control valve device 1, thence via conduit 9, through passageways 96, 95 to chamber 94, thence via passageway 97 to chamber 69 to unbalance the relay valve device 64. Such action moves valve device 64 leftward as viewed in FIG. 2 to unseat check valve device 84 and thereby permits the pressurized fluid from auxiliary reservoir 7 to flow via conduit 11, passageway 109 to simultaneously charge balancing chamber 68 (through choke 83) and brake cylinders 15 via passageways 81, 82, and conduit 16 for an increase in braking application. It will be noted that in the initial reduction of brake pipe pressure, chamber 94 is pressurized to a sufficient pressure until the bias of spring 102 is overcome, such that the stem portion 92 is seated on valve seat 101 to prevent any further build up of pressure in the intermediate chamber 70. Thereafter any further reduction in brake pipe pressure as was just described is ineffective to conduct pressurized fluid to the intermediate chamber 70 such that any further build up of pressure in the brake cylinders 15 is done on the ratio of effective size of the large diaphragm 66 to the small diaphragm 67; whereas, in the initial brake pipe reduction, the intermediate chamber 70 was pressurized which is balanced by pressurization of balancing chamber 68. Such balancing operating on the common diaphragm 66 thereby effects a one-to-one braking ratio which assures bringing of the brake shoes 14 into contact with the tread of a railway wheel on a minimum braking application.

Further reduction in brake pipe pressure initiates a similar cycle in which the brake control valve device 1 establishes communication between air reservoir 6, auxiliary reservoir 7, and conduit 9 to pressurize outer chamber 69 which unseats check valve device 84 as described above to thereby effect a further braking application on a reduced ratio in accordance with the diaphragm sizes as set forth above.

In the event that a further reduction in brake pipe pressure initiates an emergency brake application, a similar cycle is repeated wherein the brake control valve device 1 establishes communication between the air reservoir 6, auxiliary reservoir 7, and the emergency reservoir 8 to pressurize outer chamber 69. Pressurization of outer chamber 69 effects the unseating of check valve device 84 such that pressurized fluid, from the respective reservoirs, flows via conduit 11, the clearance space 74, passageways 81 and 82, conduit 16 to the respective brake cylinders 15 to effect a maximum brake application.

When the pressure in the brake pipe 4 is increased to thereby release the brakes, the brake cylinder supply pipe 9 via control valve device 1 is connected to atmosphere, thereby connecting outer valve chamber 69, via passageways 97, 95, 96, and conduit 9 to atmosphere and consequently moving relay valve device 64 rightwardly as viewed in FIG. 2 until reduced end portion 72 is displaced rightwardly with respect to the check valve device 84. Such action releases the brakes, since the brake cylinders 15 are connected via conduit 16, passageway 82, passageway 81, annular bore 80 to the clearance space 74 which is connected via longitudianlly extending bore 75 in stem 71 to the annular groove 73 on the stem portion 71, which is connected via annular groove 78 and port 77 to atmosphere.

Assuming that the brake pipe 4 has been vented to below 10 p.s.i. or to atmosphere for emergency application of the brakes, the fluid pressure in charging pipe 41, pasageway 43, branch passageway 44, as well as control chamber 40 will be vented to atmosphere, thereby subjecting stems 38 and 51, motor pistons 36 and 37 only to the forces of the respective springs 47 and 56 which thereby centers the stems 38 and 51 into their neutral position or zone as shown in FIG. 2. Upon recharging of the brake pipe 4 under these conditions, the load measuring device 5 operates to check the load or empty condition of the railway car. In the event the railway car is empty, the operation is as described above; however, if the railway car is loaded, the change-over valve device 3 is conditioned in a manner to be described.

It should be noted that the load measuring device 5 is actuated to regitser a loaded or empty condition of a railway car whenever an emergency brake pipe reduction has been effected, such that the stems 47 and 63 return to neutral and are in condition for directing fluid to the load measuring device 5. Assuming a neutral position of stems 38 and 51 and a loaded condition of a railway car, the position of the strut cylinder 20 relative to the unsprung portion 19 of the railway car is such as is shown in full lines in FIG. 1, wherein the stop member 24 on the movable piston rod 22 is in such a position that upward movement of the stop member 24 relative to the stop member 18 is such as to uncover passageway 30 to establish communication between passageways 27 and 30.

Assuming a loaded car condition and that the change-over valve device 3 is in neutral position, on charging of the brake pipe 4, pressurized fluid will flow via the brake pipe 4 through the brake control valve device 1, via charging conduit 41 to the control chamber 40 and the load measuring device 5. Charging pipe 41 conducts the pressurized fluid via passageway 43, annular groove 62 in stem 51, passageway 110, conduit 28 to chamber 26 in strut cylinder 20 to exert an upward force upon the control piston 21 thereby moving control piston 21 upwardly to establish communication between passageways 27 and 30. Such action permits the flow of pressurized fluid from chamber 26 in strut cylinder 20, via conduit 31 to passageway 119, and thence through bore 35 in the clearance space provided by the reduced end portion of the respective stems 38 and 51, through passageway 120 to the chamber 55 on the right-hand portion on change-over valve device 3. Pressurization of chamber 55 is opposed by the pressurization of control chamber 40 which is pressurized via passageways 44 and 43 from charging pipe 41. The differential force developed between the chambers 55 and 40 on their respective diaphragms 52 and 39 is such as to move the motor pistons 36 and 37 leftward as viewed in FIG. 2 being that the diaphragm 52 and motor piston 37 are larger in cross sectional area than the diaphragm 39. Such leftward movement of stems 38 and 51 operates to block communication between passageways 43 and 110; however, communication is established between passageways 43 and 120 to thereby maintain pressurization of chamber 55 from the charging pipe 41 via passageways 43 and 120. Such leftward movement of stems 38 and 51 also establishes communication between passageways 96, and 104 for a purpose to be described. Such action also vents chamber 26 in strut cylinder 20 to atmosphere since the annular groove 63 on stem 51 registers passageway 110 with chamber 53 which is vented to atmosphere via port 54. The compressed spring 25 in strut cylinder 20 operates to return control piston 21 downwardly to air in the exhaustion of the pressurized fluid from control chamber 26. Chamber 29 in strut cylinder 20 is vented to atmosphere via port 23. In addition port 23 vents conduit 31 upon movement of control piston 21 downwardly past passageway 30. The load measuring device 5 is thus locked out of operation until the brake pipe pressure is reduced to atmosphere which recenters the respective stems 38 and 51 in a manner described above.

During the charging of the brake pipe 4 in the usual manner, brake control valve device 1 operates to charge the auxiliary reservoir 7, emergency reservoir 8, and air reservoir 6 in the usual manner and in addition thereto change-over valve device 3 operates to augment and facilitate the charging of the respective reservoirs through the one-way check valve 105 described above. While the railway vehicle is in the loaded car condition and the brake pipe pressure is reduced under operator control in the usual manner for causing a brake application, brake control valve device 1 operates to supply fluid from air reservoir 6, and auxiliary reservoir 7 to the brake cylinders 15 via supply pipe 9. The pressurized fluid flows via supply pipe 9, passageway 96, passageway 95 to charge chamber 94 as well as to charge outer chamber 69 in relay valve device 64 via passageway 97 interconnecting such chambers. In addition, pressurized fluid from supply pipe 9 is conducted via passageway 96, annular bore 61 and passageway 104 to chamber 103 in inshot valve device 65 to provide a reactionary force upon piston valve member 91 to maintain stem 92 unseated from seat 101 such that the pressurized fluid from chamber 94 flows via bore 98 into chamber 99 and thence via passageway 100 to intermediate chamber 70. Pressurization of the intermediate chamber 70 and the outer chamber 69 operates to move relay valve device 64 in a leftward direction as viewed in FIG. 2 to unseat check valve device 84 and communicate clearance space 74 with the chamber 85 such that the pressurized fluid from the auxiliary reservoir 7 and air reservoir 6 is conducted via conduit 11 to passageways 106, and 109 and thence via chamber 85 to the clearance space 74, annular groove 80 and passageways 81, 82 for direction to the brake cylinders 15 and the balancing chamber 68. Pressurization of brake cylinders 15 provides a braking application as is well understood in the art. When the fluid pressure in the balancing chamber 68 is sufficient to overcome the fluid pressure in the intermediate chamber 70, an equalization of the net differential forces develops to seat valve device 84 and terminate any further increase in braking application. A one-to-one ratio of brake application is provided since the effective resultant area of the diaphragms between chambers 68 and 70 is equal. Pressurization of chamber 69 via passageway 97 is neutralized in effect by the pressurization of intermediate chamber 70 since they have a common diaphragm.

Any further reduction in brake pipe pressure operates to supply an additional amount of pressurized fluid from the auxiliary reservoir 7 to supply pipe 9 which operates to augment the pressure in the intermediate chamber 70 as described above which operates to unseat the check valve device 84 and thereby supplements and increases the pressure in the brake cylinders 15 which in turn increases the braking action. When the pressure in the brake pipe 4 is increased to release the brakes in a manner well known in the art, the brake cylinder supply pipe 9 is vented to atmosphere via brake control valve device 1 to thereby vent the brake cylinders 15 as well as chambers 70 and 69 of the relay valve device 64 in a manner described above.

Having now described the invention, what I claim as new and desire to secure by Letters Patent, is:

1. A change-over valve device having:
   (a) a casing,
   (b) an input connection,
   (c) selector valve means operative between a first and second position,
   (d) means for moving said selector valve means into said first and second positions,
   (e) relay valve means having a normally seated valve member operative upon actuation to connect a pair of passageways, wherein one of said passageways is adapted to be connected to a pressure source,
   (f) said relay valve means having a pair of spaced diaphragms of different effective areas cooperative with said casing to define pressure chambers,
   (g) one of said diaphragms being common to a pair of adjacent pressure chambers,
   (h) valve means,
   (i) said relay valve means having one of said adjacent pressure chambers constantly connected to said input connection for actuation of said relay valve means and actuation of said normally seated valve member upon pressurization of said input connection,
   (j) said selector valve means in one of said positions conditions said valve means to maintain communication between the other of said adjacent pressure chambers through said valve means to said input connection for actuation of said relay valve means and actuation of said normally seated valve member upon pressurization of said input connection,
   (k) said relay valve means cooperative with a portion of said casing to define a balancing chamber,
   (l) the other of said diaphragms being common to said balancing and said other adjacent pressure chamber,
   (m) said balancing chamber operatively connected to the other of said passageways for pressurization of said balancing chamber to balance pressure in said pressure chambers for seating of said valve member,
   (n) said valve means normally interconnecting said input connection to the other of said adjacent pressure chambers, and (o) said selector valve means in the other of said positions, conditions said valve means to make such said valve means responsive to a predetermined pressure in said input connection to block communication between said input connection and said other pressure chamber.

2. A load compensating brake system for a railway car comprising:
(a) a brake pipe,
(b) brake cylinder means for effecting a braking application,
(c) brake controlling means responsive to a reduction in pressure in said brake pipe to supply fluid under pressure from a pressure source to a first conduit, and responsive to a subsequent increase in the brake pipe pressure to release fluid under pressure from said first conduit,
(d) a change-over valve device having selector valve means operable between a first and second position,
(e) means for selectively positioning said selector valve means to said first or second position,
(f) said change-over valve device having:
(i) a sectionalized casing,
(ii) a relay valve means having a normally seated valve member operative upon actuation to connect a pair of passageways wherein one of said passageways is connected to a pressure source,
(iii) said relay valve means having at least a pair of spaced diaphragms of different effective areas cooperative with said casing to define three adjacent pressure chambers,
(iv) a pair of said pressure chambers operative upon pressurization of one or both of said chambers to actuate said normally seated valve member,
(v) one of said pair of pressure chambers being constantly in communication with said first conduit while the third of said three pressure chambers is operatively connected to the other of said passageways for pressurization of said third chamber to deactuate said normally seated valve member,
(vi) an inshot valve device mounted in a removable portion of said sectionalized casing wherein said inshot valve device is cooperative with said selector valve means in one of said positions to connect the other of said pair of pressure chambers to said first conduit, and
(vii) said inshot valve device cooperative with said selector valve means in the other of said positions to communicate the other of said pair of pressure chambers to said first conduit only up to a predetermined pressure after which communication is blocked between said conduit and said last mentioned pressure chamber.

3. A load compensating brake system for a railway car comprising:
(a) a brake pipe,
(b) brake cylinder means operative upon actuation for effecting a braking application,
(c) a pressure source,
(d) brake controlling means responsive to a reduction in pressure in said brake pipe to supply fluid under pressure from said pressure source to a first conduit, and responsive to a subsequent increase in brake pipe pressure to release fluid under pressure from said first conduit,
(e) a change-over valve device having selector valve means operable between a first and second position,
(f) means for positioning said selector valve means into said first or said second position,
(g) said change-over valve device including:
(i) a casing,
(ii) a relay valve means having a normally seated valve member operative upon actuation to connect a pair of passageways, wherein one of said passageways is connected to said pressure source and the other of said passageways is connected to said brake cylinder means,
(iii) said relay valve means having a pair of spaced diaphragms of different effective areas cooperative with said casing to define an intermediate pressure chamber and two outer pressure chambers, one of said two outer pressure chambers being in constant communication with said first conduit,
(iv) said relay valve means operative upon actuation to actuate said normally seated valve member,
(v) an inshort valve device having a differential piston reciprocably mounted in a chamber in said change-over valve device,
(vi) one side of said differential piston being operatively subjected to pressure of fluid in said first conduit and in said one of said two outer pressure chambers,
(vii) the other side of said differential piston normally vented to atmosphere,
(viii) said differential piston having a hollow stem normally interconnecting said one side of said piston to said intermediate pressure chamber, and
(ix) said differential piston operative upon a predetermined pressure in said first conduit for actuating said differential piston to move said stem into engagement with a valve seat to block communication between said intermediate pressure chamber and said one side of said piston.

4. A load compensating brake system for a railway car as set forth in claim 3 wherein:
(a) said selector valve means is operative in one of said positions to interconnect said first conduit to said other side of said piston to maintain constant communication between said intermediate pressure chamber and said one side of said piston.

5. A change-over valve device having:
(a) a casing,
(b) an input connection,
(c) selector valve means operative between a first and second position,
(d) means for moving said selector valve means into said first and second positions,
(e) relay valve means having a normally seated valve member operative upon actuation to connect a pair of passageways, wherein one of said passageways is adapted to be connected to a pressure source,
(f) said relay valve means having a pair of spaced diaphragms of different effective areas cooperative with said casing to define a plurality of pressure chambers,
(g) one of said diaphragms being common to a pair of adjacent pressure chambers of said plurality, one of said pair of adjacent pressure chambers being constantly in communication with said input connection, and
(h) an inshot valve device cooperative with said selector valve means in its said first position for connecting said input connection to the other of said pair of adjacent pressure chambers for actuating said relay valve means to thereby actuate said valve member upon pressurization of said input connection with fluid at a degree up to a predetermined pressure, and being responsive to fluid in said input connection at a pressure above said predetermined pressure to block communication between said input connection and said other of said pair of adjacent pressure chambers,
(i) said selector valve means being operative in its said second position for connecting said input connection to an over-riding chamber in said inshot valve device to maintain said inshot valve device in a preset condition for maintaining communication between said input connection and said other of said adjacent pressure chambers notwithstanding the degree of pressure in said input connection relative to said predetermined pressure.

References Cited in the file of this patent

UNITED STATES PATENTS 2,940,799   Seger ------------------ June 14, 1960